(12) United States Patent
Devaney et al.

(10) Patent No.: US 7,135,792 B2
(45) Date of Patent: Nov. 14, 2006

(54) HIGH FIELD VOICE COIL MOTOR

(75) Inventors: Thomas J. Devaney, Watchung, NJ (US); Chun Li, Plainview, NY (US)

(73) Assignee: Dexter Magnetic Technologies, Inc., Fremont, CA (US)

( * ) Notice: Subject to any disclaimer, the term of this patent is extended or adjusted under 35 U.S.C. 154(b) by 0 days.

(21) Appl. No.: 11/127,469

(22) Filed: May 11, 2005

(65) Prior Publication Data

US 2005/0264108 A1   Dec. 1, 2005

Related U.S. Application Data

(60) Provisional application No. 60/570,579, filed on May 12, 2004.

(51) Int. Cl.
*H02K 41/00* (2006.01)

(52) U.S. Cl. ....................... 310/12

(58) Field of Classification Search ............ 310/12, 310/13, 14; 360/264.7, 264.8, 264.9, 265
See application file for complete search history.

(56) References Cited

U.S. PATENT DOCUMENTS

| | | |
|---|---|---|
| 4,470,131 A | 9/1984 | Hatayama et al. |
| 4,638,281 A | 1/1987 | Baermann |
| 5,046,235 A | 9/1991 | Taneda et al. |
| 5,886,609 A * | 3/1999 | Stelter .................. 335/306 |
| 6,104,108 A * | 8/2000 | Hazelton et al. ............ 310/12 |
| 6,316,849 B1 * | 11/2001 | Konkola et al. ............ 310/12 |
| 6,864,602 B1 * | 3/2005 | Korenaga ................. 310/12 |
| 2003/0192449 A1 * | 10/2003 | Fiske et al. .............. 104/281 |
| 2004/0207269 A1 * | 10/2004 | Hol et al. ................. 310/12 |
| 2005/0077786 A1 * | 4/2005 | De Weerdt ................. 310/12 |

FOREIGN PATENT DOCUMENTS

JP   2003116260 A   *  4/2003

* cited by examiner

*Primary Examiner*—Darren Schuberg
*Assistant Examiner*—Erik Preston
(74) *Attorney, Agent, or Firm*—Blakely Sokoloff Taylor & Zafman

(57) ABSTRACT

An embodiment of the invention is a particular arrangement of permanent magnets that generates a higher strength and more uniform magnetic field than existing permanent magnet arrangements for a voice coil motor. The permanent magnet arrangement of an embodiment is based on the Halbach arrangement of permanent magnets. The increased magnetic field strength and uniformity allows for a voice coil motor that is both capable of higher frequency actuations as well as more uniform force over the full stroke of the actuation.

14 Claims, 14 Drawing Sheets

HIGH FIELD VOICE COIL MOTOR

CLAIM OF PRIORITY

This application is related to, and hereby claims the benefit of, provisional application No. 60/570,579 filed May 12, 2004.

FIELD

Embodiments of the invention relate to a voice coil motor and more specifically to an arrangement of magnets to drive the voice coil motor.

BACKGROUND

Speed, efficiency, and accuracy, among other criteria, are manufacturing floor benchmarks. In an ever increasingly competitive manufacturing market, the firm that can fabricate higher quality parts in less time with a more efficient utilization of resources will succeed versus its less capable counterparts. One such industry is the semiconductor industry. Engineers in the semiconductor industry, particularly those involved with wafer and die processing and control equipment, have many devices from which to choose for motion control apparatuses. One such device is a voice coil motor, also called a voice coil actuator.

Originally used in loudspeakers, voice coil motors are limited motion devices that utilize a coil within a permanent magnetic field to produce a mechanical force proportional to the current applied to the coil. The motors are either linear or rotary motion, the latter of which generally has performance measured in torque versus force. Characteristic of either orientation is high acceleration (e.g., 50 gravities or more) and high frequency actuation.

The voice coil motors can be controlled by either a closed loop or open loop control system. In a closed loop system, a position sensor can provide feedback to the motor drive electronics to control the actuation of the voice coil motor. In the open loop system the actuation of the voice coil motor is controlled simply by altering the current applied to the coil, where it is generally known that, for example, a particular current results in a particular actuation, force, or torque. For either arrangement, uniformity and controllability are important.

Voice coil motors in the semiconductor industry frequently appear to control z-axis (i.e., normal to the plane containing the surface of the semiconductor wafer) in wirebond machines. Operating in a manner similar to a sewing machine, a wirebond machine connects integrated circuit die between and among other integrated circuits, circuit elements, and circuit substrate features with very fine conducting wires (e.g., generally 0.001 inch diameter or less).

As semiconductor device sizes decrease and device density increases, it is becoming more important that the wirebond machines are simultaneously highly position accurate and fast. Further, as the layers onto which the wirebond machine adheres wire interconnects become thinner and often more fragile, the z-axis control is critical so as to properly adhere, through for example applied force, ultrasonic vibration, and heat, the wire to the semiconductor device without damaging the surface of the device. The controllability, speed, and efficiency, among other features, (i.e. "performance") of the voice coil motor depends in part on the configuration of the permanent magnets and resulting permanent magnetic field in which the coil operates.

DETAILED DESCRIPTION

Embodiments of a permanent magnet arrangement and a high field voice coil motor including the permanent magnet arrangement will be described. Reference will now be made in detail to a description of these embodiments as illustrated in the drawings. While the embodiments will be described in connection with these drawings, there is no intent to limit them to drawings disclosed herein. On the contrary, the intent is to cover all alternatives, modifications, and equivalents within the spirit and scope of the following discussion.

Briefly, an embodiment of the invention is a particular arrangement of permanent magnets that generates a higher strength and more uniform magnetic field than existing permanent magnet arrangements for a voice coil motor. The permanent magnet arrangement of an embodiment is based on the Halbach arrangement of permanent magnets. The increased magnetic field strength and uniformity allows for a voice coil motor that is both capable of higher frequency actuations as well as more uniform force over the full stroke of the actuation.

As noted, a noteworthy use of voice coil motors, in particular those with rotary motion, is to drive the z-axis motion on a wirebond machine. Important parameters for forming a proper wirebond include pressure applied by the capillary, heat of the substrate, and ultrasonic force applied to both scrub the bond pad of debris and to form the metallurgical bond (i.e., eutectic bond) between the wire and the bond pad. A z-axis actuator of a wirebond machine must be able to very precisely apply the required pressure to form an adequate bond without, for example, cratering the substrate having applied too much pressure as is well known in the art.

A further consideration is the speed with which the wirebond machine can form wirebonds. Higher magnetic fields in the z-axis voice coil actuator may lead to higher acceleration of the, for example, capillary unit so that that the wirebond machine is capable of higher frequency bonding (i.e., increased bonds/second). However, the z-axis actuator is potentially moved also in an x- and y-axis. Accordingly, an increase in mass of the z-axis actuator by, for example, increasing the size of the permanent magnets to generate higher magnetic fields, results in lower accelerations and resulting speeds for the x- and y-axis motion. A high performance z-axis actuator, therefore, should further offer high magnetic fields without adding cumbersome mass.

The force produced by a voice coil motor is a function of the length of conductor in the magnetic field, the strength of the magnetic field, and the current carried in the conductor as described by the following equation, for which i is the current through a straight wire of length L in a magnetic field B that is perpendicular to the wire:

$$\vec{F} = i\vec{L} \times \vec{B}$$

Increasing the force can be accomplished by increasing the current, length of the wire, or the magnetic field strength perpendicular to the wire. The voice coil motor of an embodiment, as will be more fully discussed below, increases the force (or torque if configured to produce a rotary motion about a pivot point) by increasing B in the air gap of the permanent magnet arrangement. The increased B leads to improved voice coil motor performance.

Figure 1:
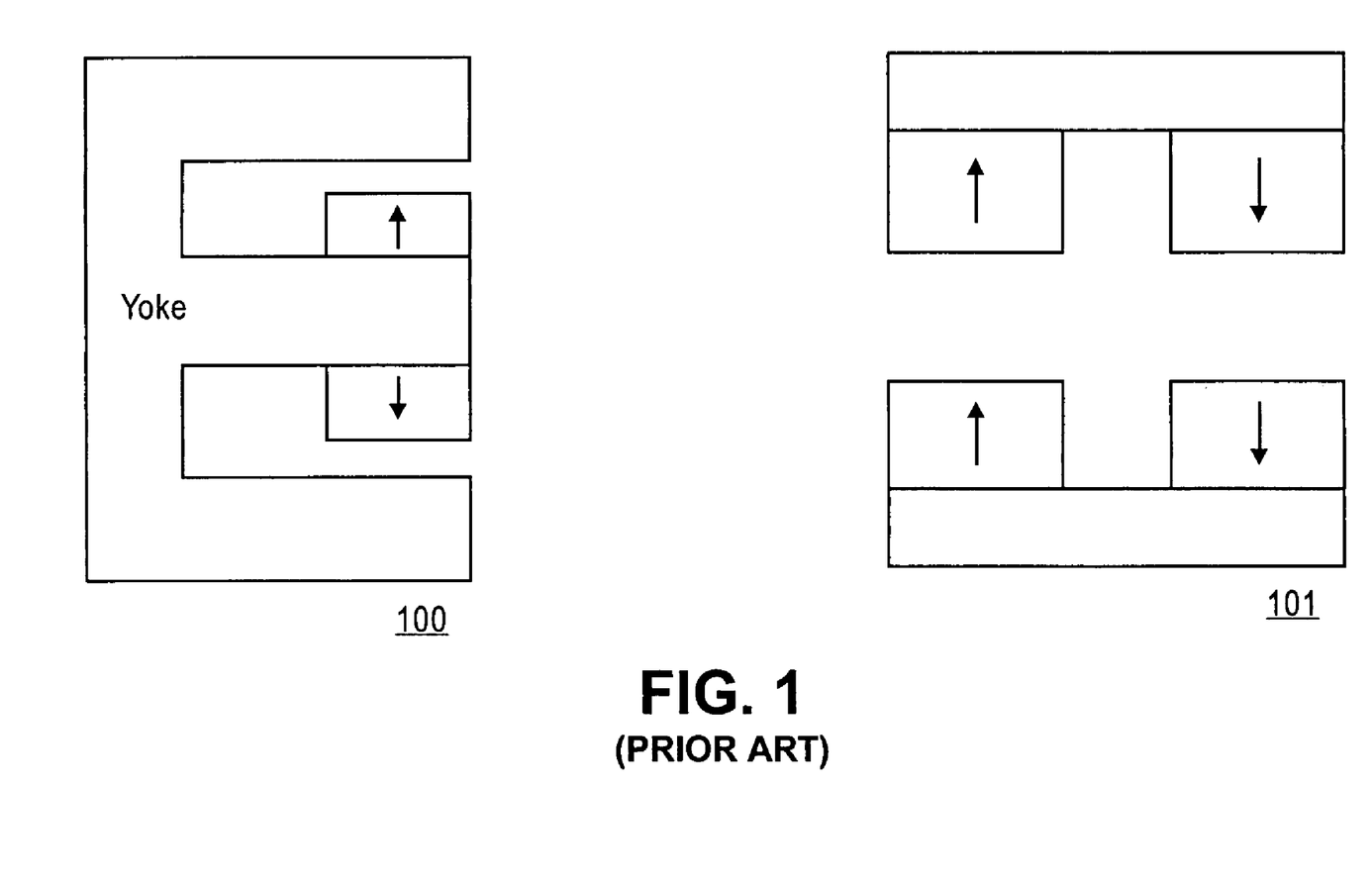
FIG. 1: illustration of a cross section of two prior art voice coil motor permanent magnet configurations.

FIG. 1 illustrates two prior art configurations of permanent magnets utilized in voice coil motors. The magnetic flux density in the prior art designs, as illustrated by magnet arrangement 100 and magnet arrangement 101, is low and normally less than 10000 Gauss when utilizing 48 mega gauss oersteds (MGOe) neodymium iron boron (NdFeB) magnets. The prior art magnet arrangement 100 and magnet arrangement 101 are further typically not efficient in terms of force (or torque) to weight ratio.

Figure 2:
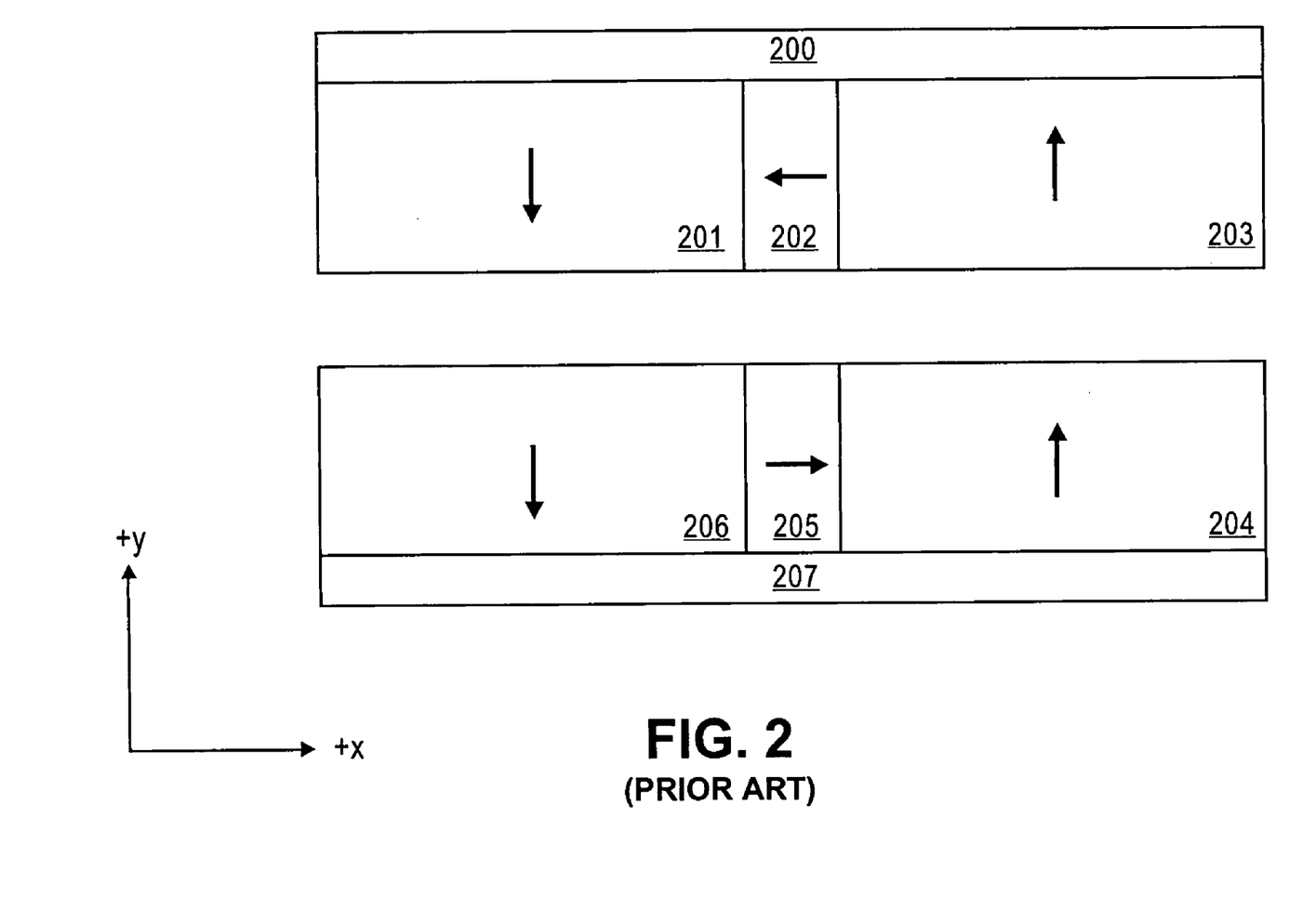
FIG. 2: illustration of a cross section of another prior art voice coil motor permanent magnet configuration.

FIG. 2 illustrates another prior art permanent magnet configuration utilized in a voice coil motor. As depicted by FIG. 2, the magnetic pole orientations of the constituent magnets 201–206 can be described with reference to the Cartesian axes adjacent to the magnet arrangement and used for illustrative purposes only. The prior art magnet arrangement of FIG. 2 includes two distinct sections that are separated by a gap through which the voice coil will travel. The first section includes a base plate 200 and magnets 201–203, the magnets 201–203 having magnetic pole orientations in the −y, −x, and +y directions respectively. The second section includes a base plate 207 and magnets 204–206, the magnets 204–206 having magnetic pole orientations in the +y, +x, and −y directions respectively.

This prior art arrangement illustrated by FIG. 2 has good efficiency, but it suffers some drawbacks. For example, the motor assembly requires a holding structure to maintain the air gap between the two distinct sections. Further, the magnetic flux density decreases at the edges of the gap (i.e., toward the distal edges of magnets 201, 203, 204, and 206).

The magnetic flux density decrease causes the torque generated by the magnet arrangement and voice coil (not illustrated) to decrease significantly when the voice coil rotates to the two travel extremes within the permanent magnet gap.

Figure 3:
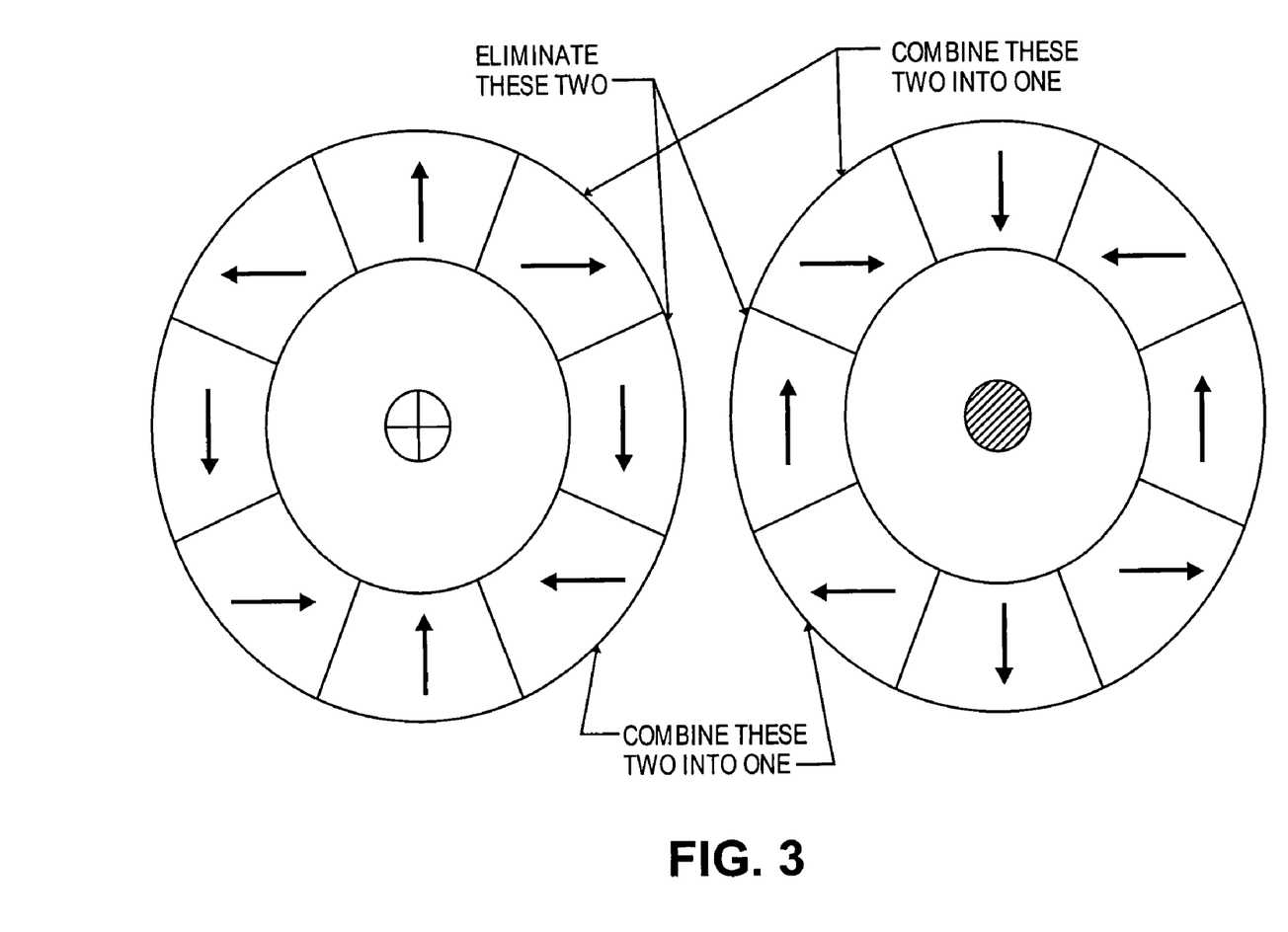
FIG. 3: illustration of a Halbach arrangement of permanent magnets and the modifications to generate FIG. 4.

FIG. 3 illustrates a permanent magnet arrangement for a Halbach cylinder. The Halbach cylinder, named for Klaus Halbach of Lawrence Berkeley National Laboratory, is an arrangement of magnets that generates a uniform field in the bore of a hollow cylinder. In particular, the Halbach cylinder generates a uniform magnetic field at a right angle to the axis of the bore. The combination of the magnets, due in part because modern rare-earth and ferrite magnets are essentially transparent to the flux generated by adjacent magnets, generates a uniform magnetic field in the bore of the cylinder and zero magnetic field outside the cylinder. It is the uniformity and strength of the bore magnetic field that makes the Halbach cylinder a desirable basis for the permanent magnet arrangement of an embodiment.

Figure 4:
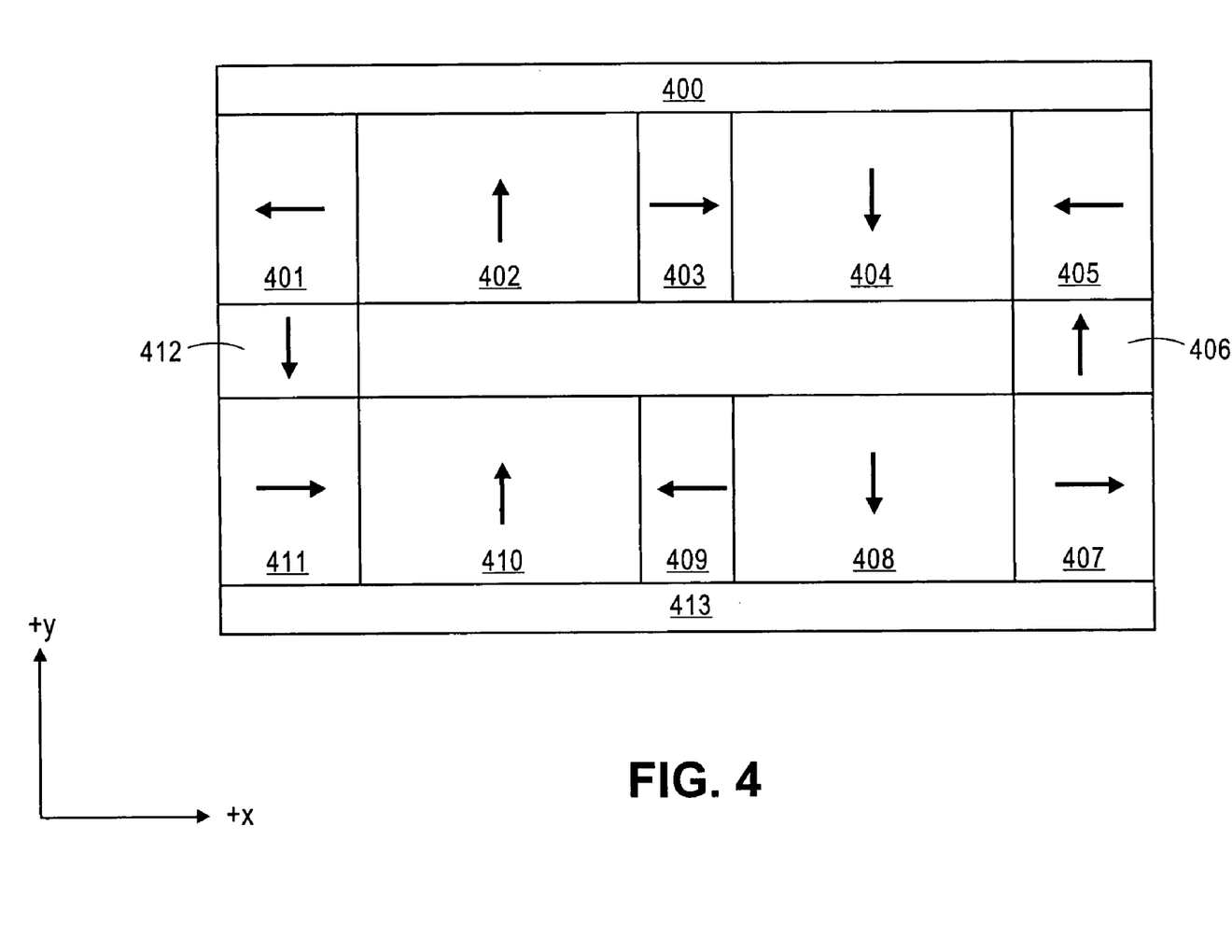
FIG. 4: illustration of a cross section of an embodiment modifying the Halbach permanent magnet arrangement for a voice coil motor.

FIG. 4 illustrates a cross section of an embodiment modifying the Halbach permanent magnet arrangement to form the permanent magnet arrangement and resulting voice coil motor of an embodiment. The constituent magnets 401–412 can be described with reference to the Cartesian axes adjacent to the magnet arrangement and used for illustrative purposes only. For example, magnets 401–405 have magnetic pole orientations in the −x, +y, +x, −y, and −x directions respectively. Magnets 407–411 have magnetic pole orientations in the +x, −y, −x, +y, +x directions respectively. Magnets 406 and 412 determine the thickness of the gap between magnets 401–405 and 407–411 in which the voice coil will operate. Furthermore, unlike the prior art magnet arrangement illustrated by FIG. 2, the gap is maintained by magnets (i.e., magnets 406 and 412) versus non-magnetic spacers, allowing more of the overall magnet arrangement to contribute the permanent magnetic field generated in the gap. Magnet 405 has a magnetic pole orientation in the +y direction and magnet 412 has a magnetic pole orientation in the −y direction.

Explained alternatively, certain individual magnets illustrated in the Halbach cylinder of FIG. 3, as identified in therein, are combined and others (in particular the two magnets at the center) are deleted to fabricate the permanent magnet arrangement illustrated in FIG. 4. In addition, the overall cross sectional shape of the magnet arrangement of an embodiment is rectangular to facilitate unencumbered coil travel in the voice coil gap formed therein. The top and bottom of the assembly consists of low carbon steel back plates 400 and 413. The steel back plates serve as a portion of the return path for magnetic flux generated by the magnets 401–412 of the arrangement of an embodiment.

Furthermore, the magnetic pole orientations of the magnets comprising a magnet assembly of an embodiment can be described as a sequence of magnets that form a gap. When viewed from an end exposing the gap (as in FIG. 4) the individual magnets each have a magnetic pole orientation rotationally offset substantially 90 degrees from adjacent magnets. For example, describing the individual magnets progressing clockwise around the gap through the sequence of magnets, each magnet has a magnetic pole orientation rotated clockwise (−90 degrees) from the magnetic pole of the immediately preceding magnet.

The permanent magnet arrangement of FIG. 4 increases the magnetic flux density in the gap versus the prior art magnet arrangements illustrated by FIG. 1 and FIG. 2. The increased magnetic flux density in turn improves the performance (e.g., controllability, speed, and efficiency) of the voice coil motor incorporating the magnet arrangement of an embodiment. Said differently, as the increased magnetic flux density is based on magnet configuration versus increased magnet size, the voice coil motor of an embodiment improves the force (or torque) versus weight ratio when compared to the prior art magnet assemblies. Another benefit of the embodiment is the magnetic field uniformity over the region of interest within the gap as the magnetic field uniformity generates more uniform force (or torque) over the full voice coil motor stroke. A further benefit is that the permanent magnet assembly is self-supporting as it requires no holding structure to maintain the gap.

The permanent magnet arrangement of FIG. 4 is fabricated by bonding the magnets, for example with structural adhesive, to the steel back plates. In addition, adjacent magnets are bonded to each other using similar bonding techniques. The magnet material can be any magnetic material that produces high magnetic flux. In an embodiment, the magnet material is high quality neodymium iron boron (NdFeB).

Figure 5:
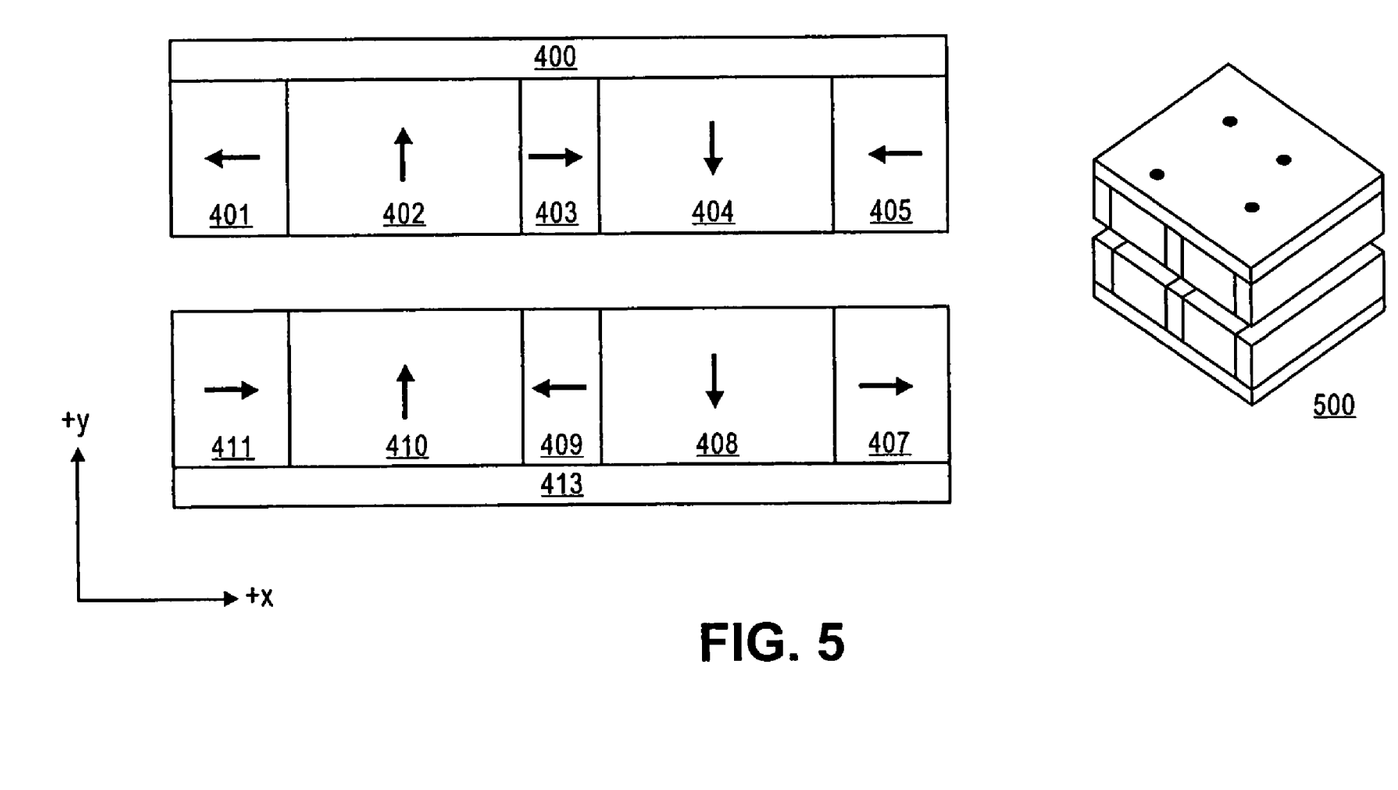
FIG. 5: illustration of a cross section of an alternative embodiment modifying the Halbach permanent magnet arrangement for a voice coil motor.

FIG. 5 illustrates the cross section of another embodiment wherein the permanent magnet arrangement incorporates, as does the embodiment illustrated in FIG. 4, design features of the Halbach cylinder as modified and applied to a voice coil motor. The constituent magnets 401–412 can be described with reference to the Cartesian axes adjacent to the magnet arrangement and used for illustrative purposes only. For example, magnets 401–405 have magnetic pole orientations in the −x, +y, +x, −y, and −x directions respectively. Magnets 407–411 have magnetic pole orientations in the +x, −y, −x, +y, +x directions respectively. The arrangement (i.e., location, shape, and pole orientation) of the individual magnets is essentially the same as the embodiment illustrated in FIG. 4; however, the magnet assembly is not self supporting as it does not include magnets 406 and 412 that both define the thickness of the gap and contribute to the magnetic field generated in the gap. The permanent magnet arrangement of FIG. 5 would require spacers to maintain the gap in which the voice coil would operate. Magnet arrangement 500 is a perspective view of the same magnet arrangement.

Figure 6:
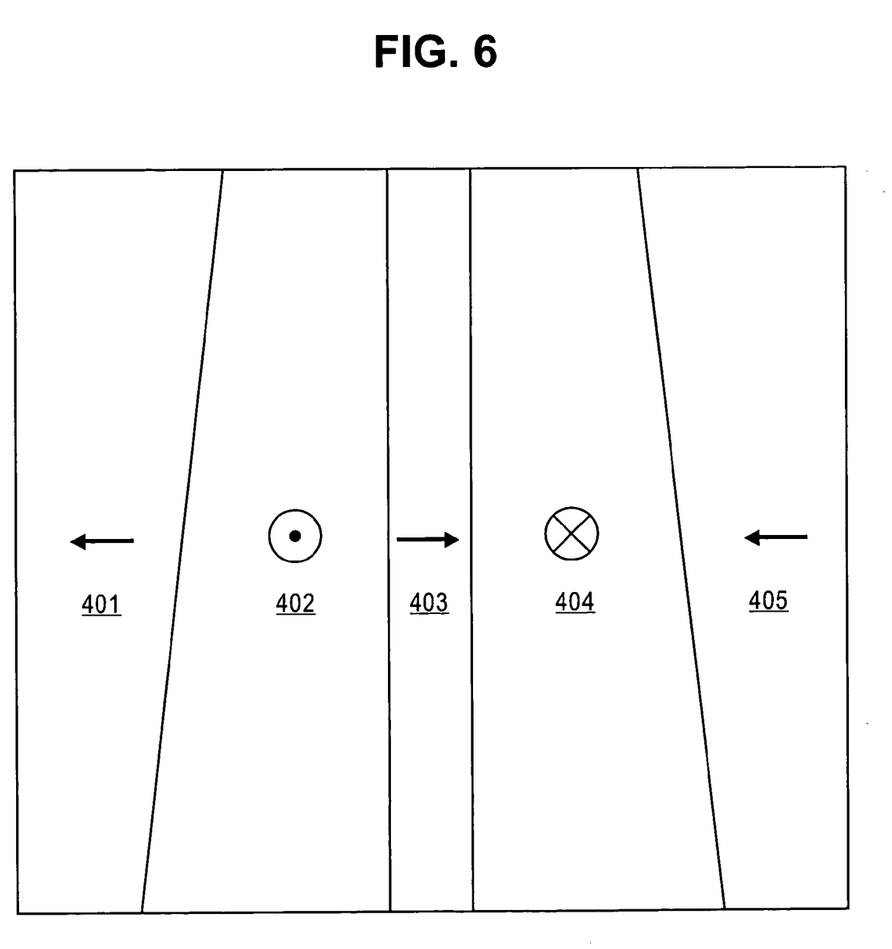
FIG. 6: illustration of a top view of the embodiments of FIG. 4 and FIG. 5

FIG. 6 illustrates the top view of the embodiments of FIG. 4 and FIG. 5, including the magnetic pole orientations that stem from the orientations listed by each Figure for magnets 401–405. The shape of the gap is defined by magnets 406 and 412 that have the same shape as the overlying magnets 401 and 405 respectively. The substantially trapezoidal shape of the gap as viewed from the top further contributes to the uniformity of the torque created by the magnet arrangement of an embodiment as will be further illustrated by FIG. 9 and FIG. 10.

Figure 7:
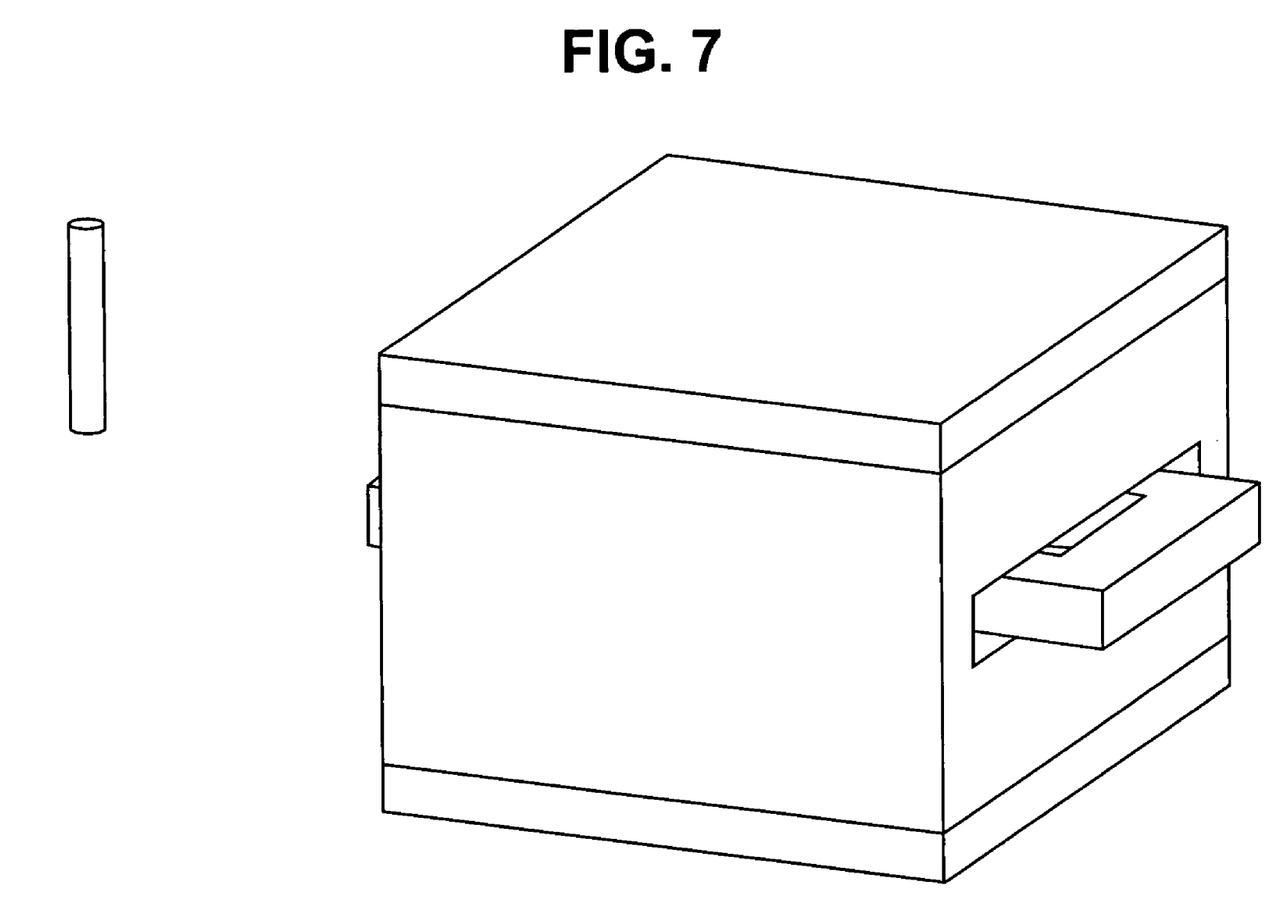
FIG. 7: illustration of a perspective view of the permanent magnet arrangement of FIG. 4 as applied to a rotary motion voice coil motor.
Figure 8:
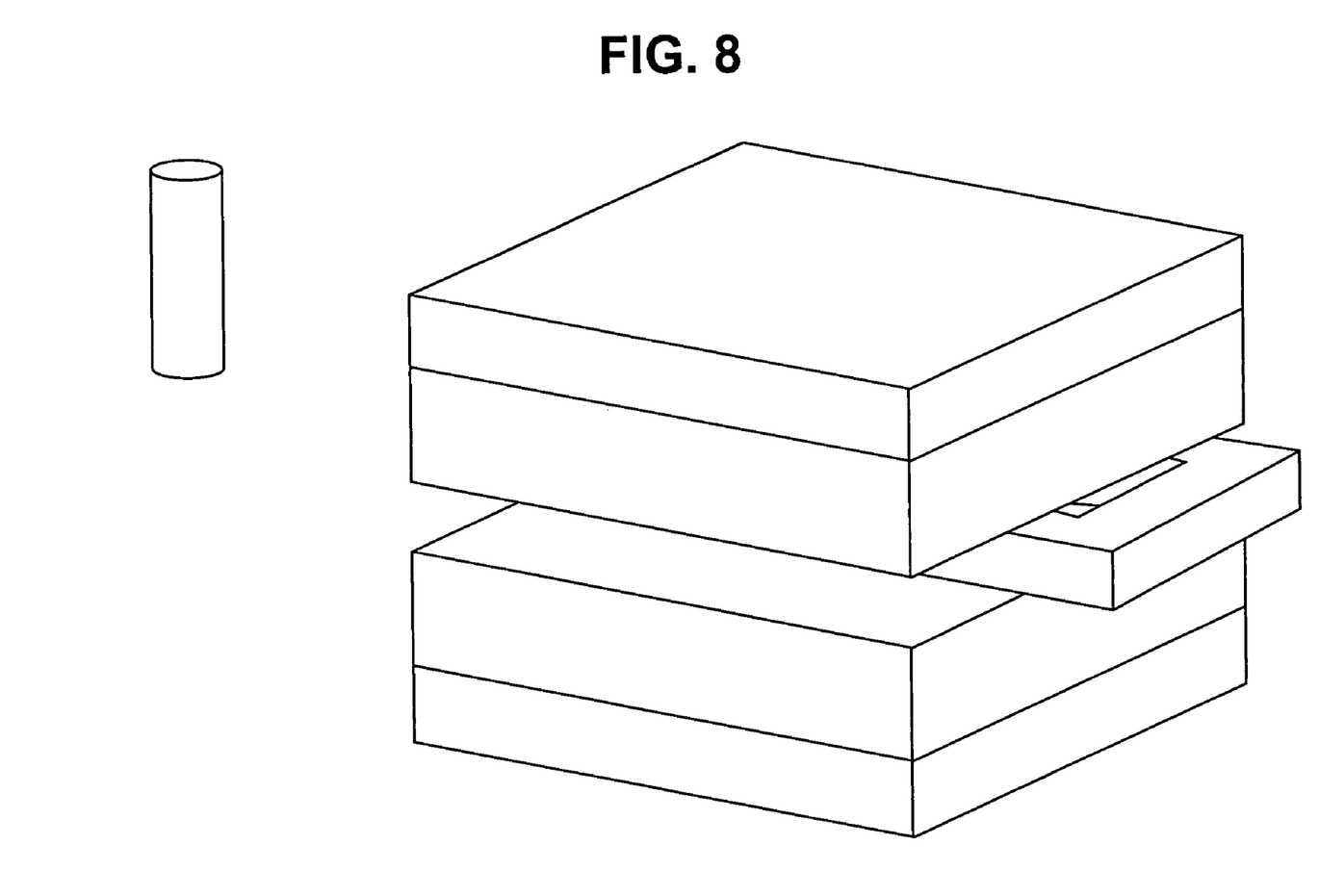
FIG. 8: illustration of a perspective view of the permanent magnet arrangement of FIG. 5 as applied to a rotary motion voice coil motor.

In the voice coil motor design of an embodiment (be it the embodiment illustrated by FIG. 4 or FIG. 5), the voice coil rotates around a pivotal point outside the gap contained within the permanent magnet assembly. FIG. 7 and FIG. 8 illustrate a perspective view of the voice coil motors of embodiments incorporating the permanent magnet arrangements illustrated by FIG. 4 and FIG. 5 respectively.

Figure 9:
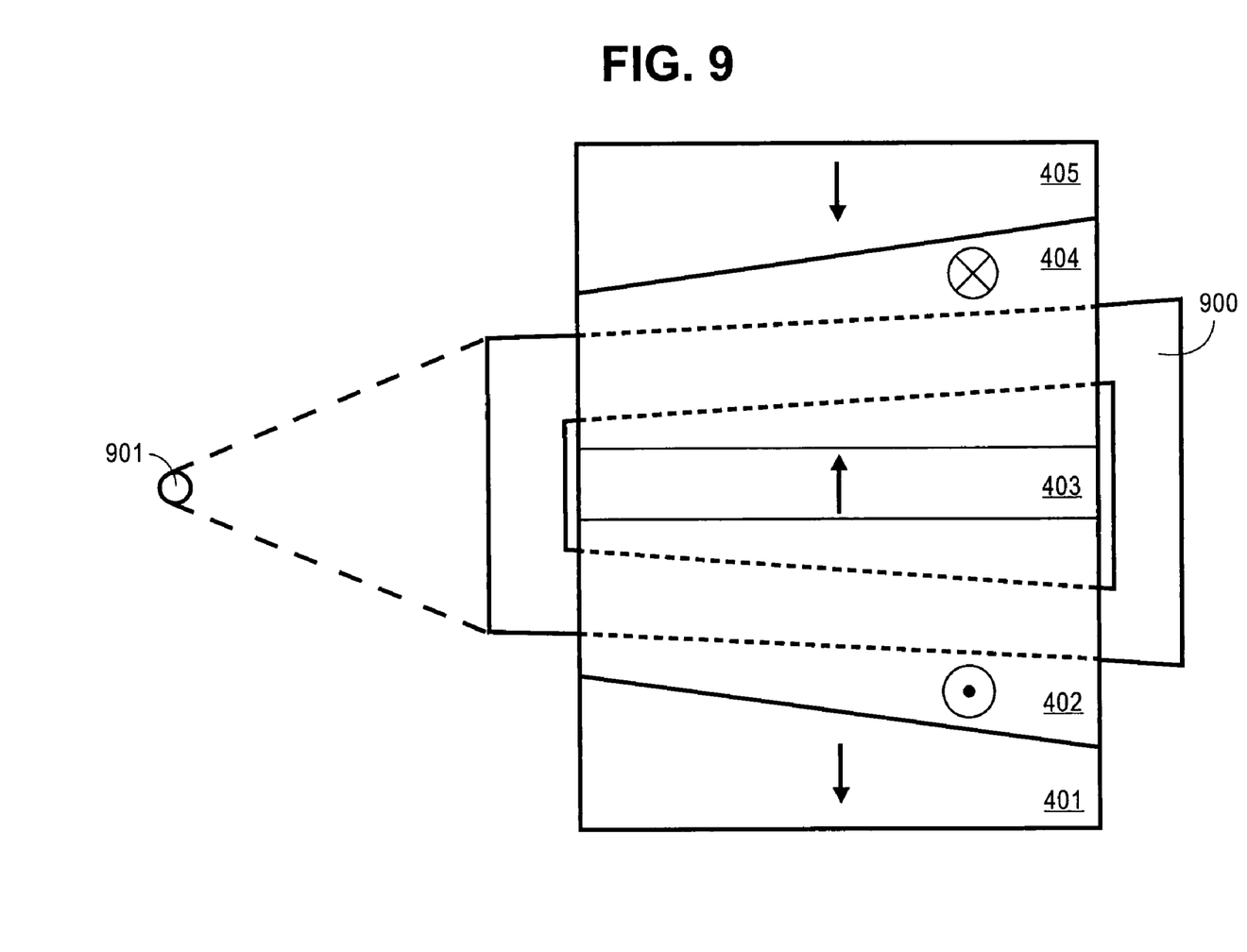
FIG. 9: illustration of a top view of the rotary motion voice coil motor of FIG. 4 showing the voice coil centered in the permanent magnet arrangement.
Figure 10:
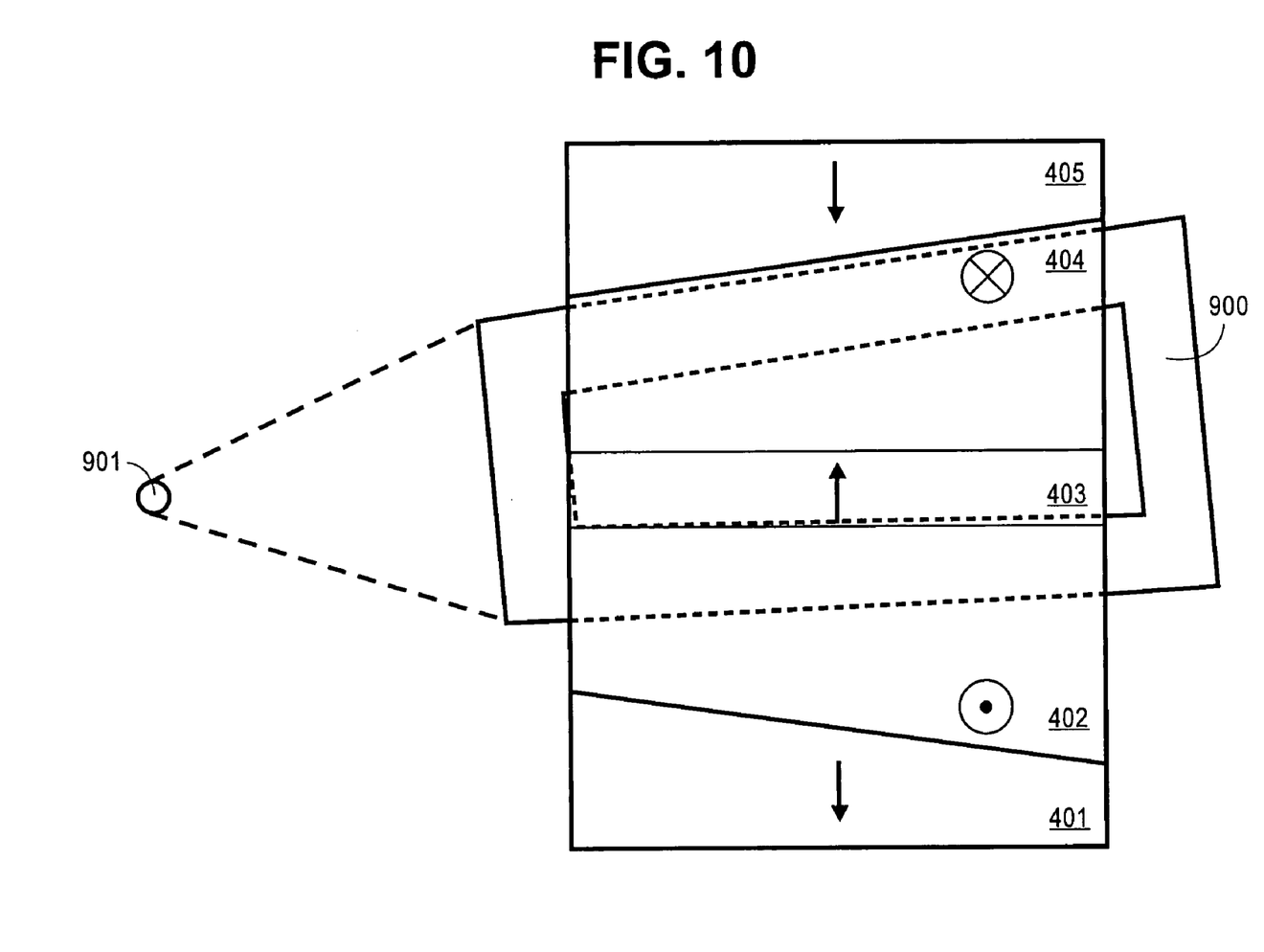
FIG. 10: illustration of the a top view of the rotary motion voice coil motor of FIG. 4 showing the coil rotated a maximum amount in the permanent magnet arrangement.
Figure 11:
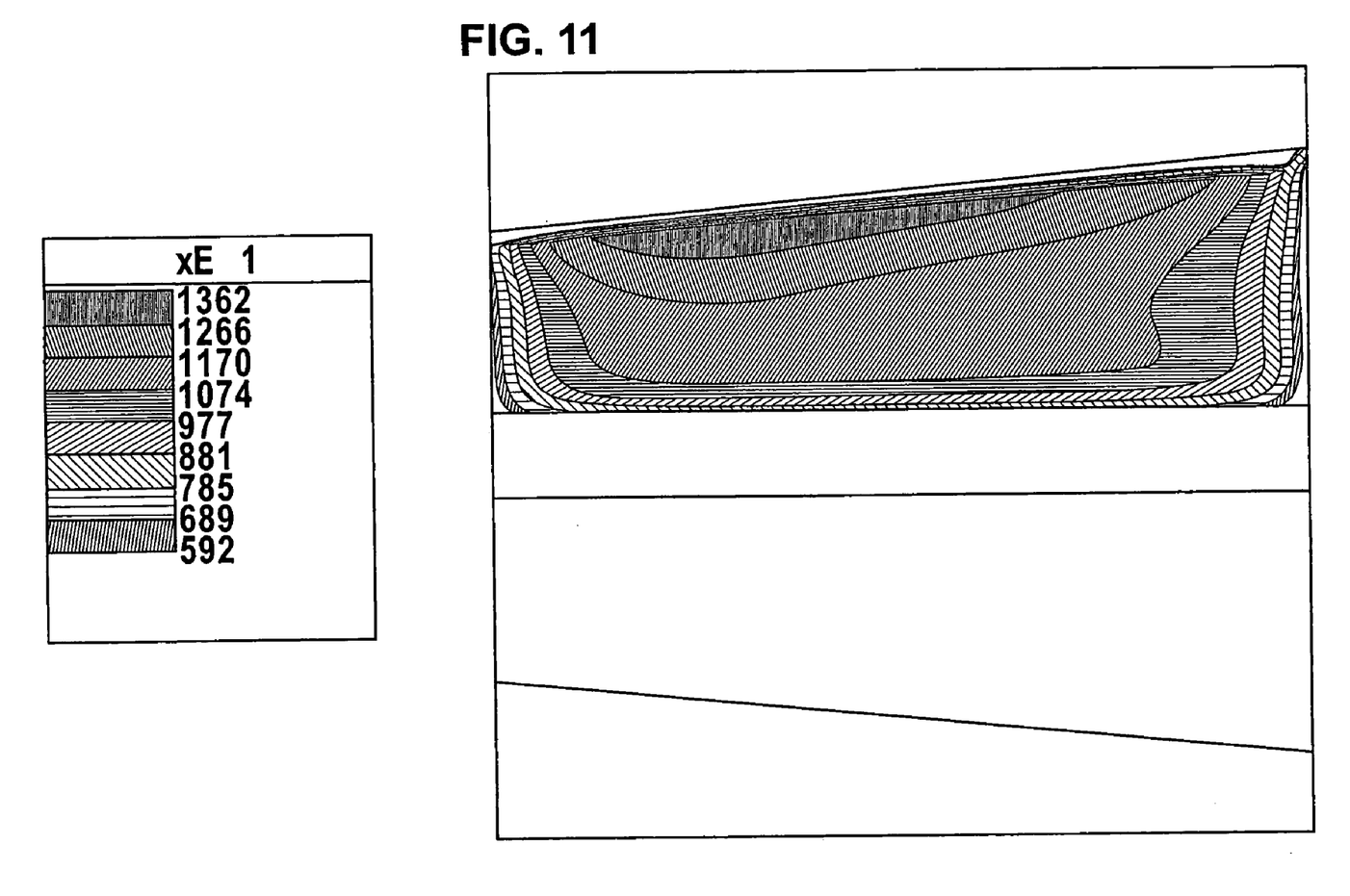
FIG. 11: illustration of a top view of the rotary motion voice coil motor of FIG. 4 showing the magnetic flux density in Gauss created by the permanent magnet arrangement.

FIG. 9 and FIG. 10 illustrate a top view of the permanent magnet arrangement illustrated by FIG. 4. Specifically, FIG. 9 illustrates a voice coil 900 centered in the gap and underlying magnets 402–404. For simplicity, only the top layer of magnets from this view (i.e., magnets 401–405) are illustrated. Voice coil 900 rotates about pivot 901 in response to an applied current as introduced above. FIG. 10 illustrates the voice coil 900 at its maximum displacement. It is to be understood that the maximum displacement may also be offset from the center of the gap in the opposite direction than what is illustrated. As introduced above, and in order to increase the efficiency, trapezoidal magnets are used in the structure so that the voice coil 900 edge, in maximum displacement, is parallel to the edge of the magnets defining the gap in which the voice coil 900 operates. FIG. 11 illustrates the same top view of the permanent magnet arrangement of the embodiment of FIG. 4 and the magnetic flux density in Gauss created thereby in the gap.

Figure 12:
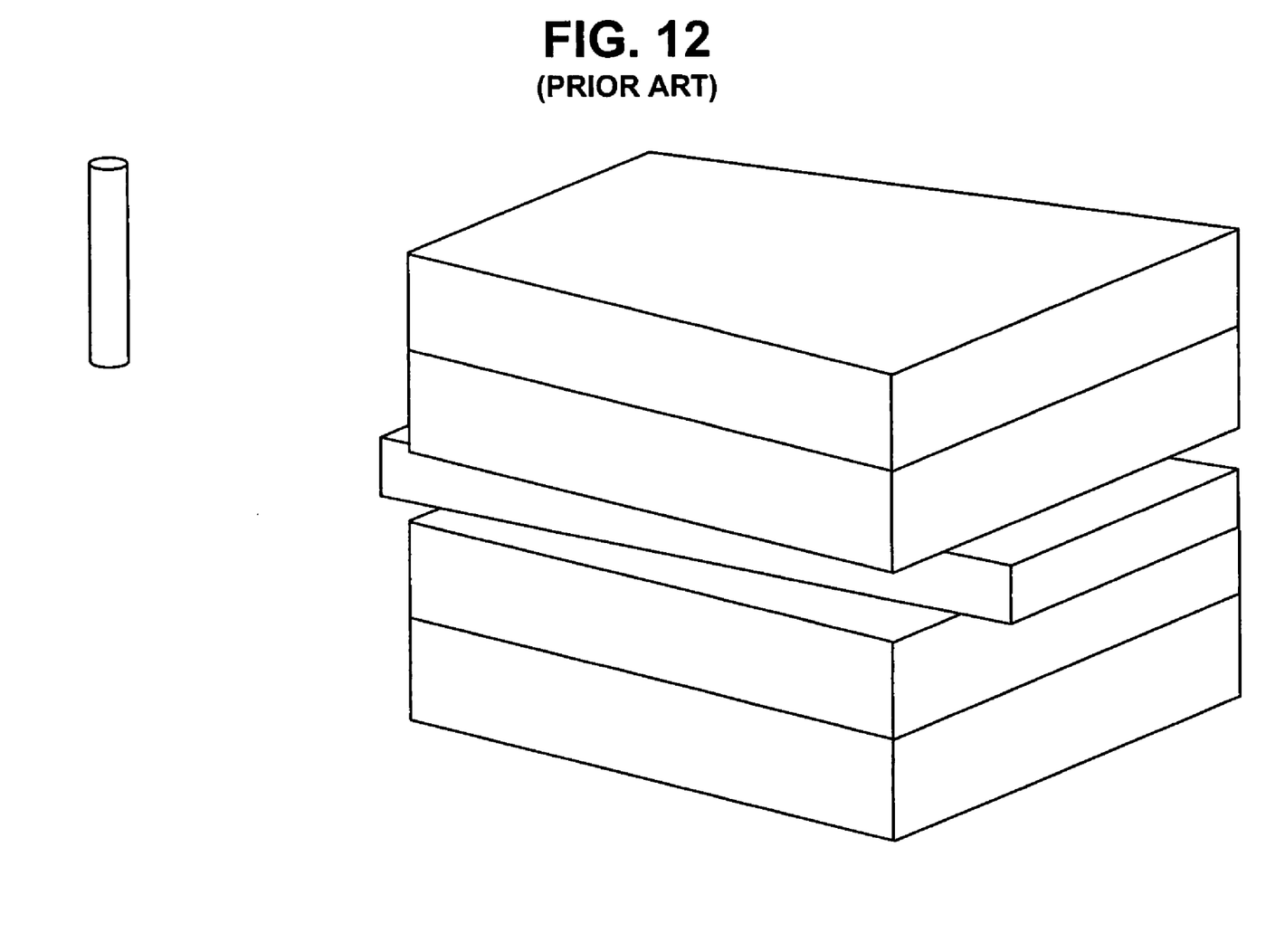
FIG. 12: illustration of a perspective view of the prior art permanent magnet arrangement of FIG. 2 as applied to a rotary motion voice coil motor.
Figure 13:
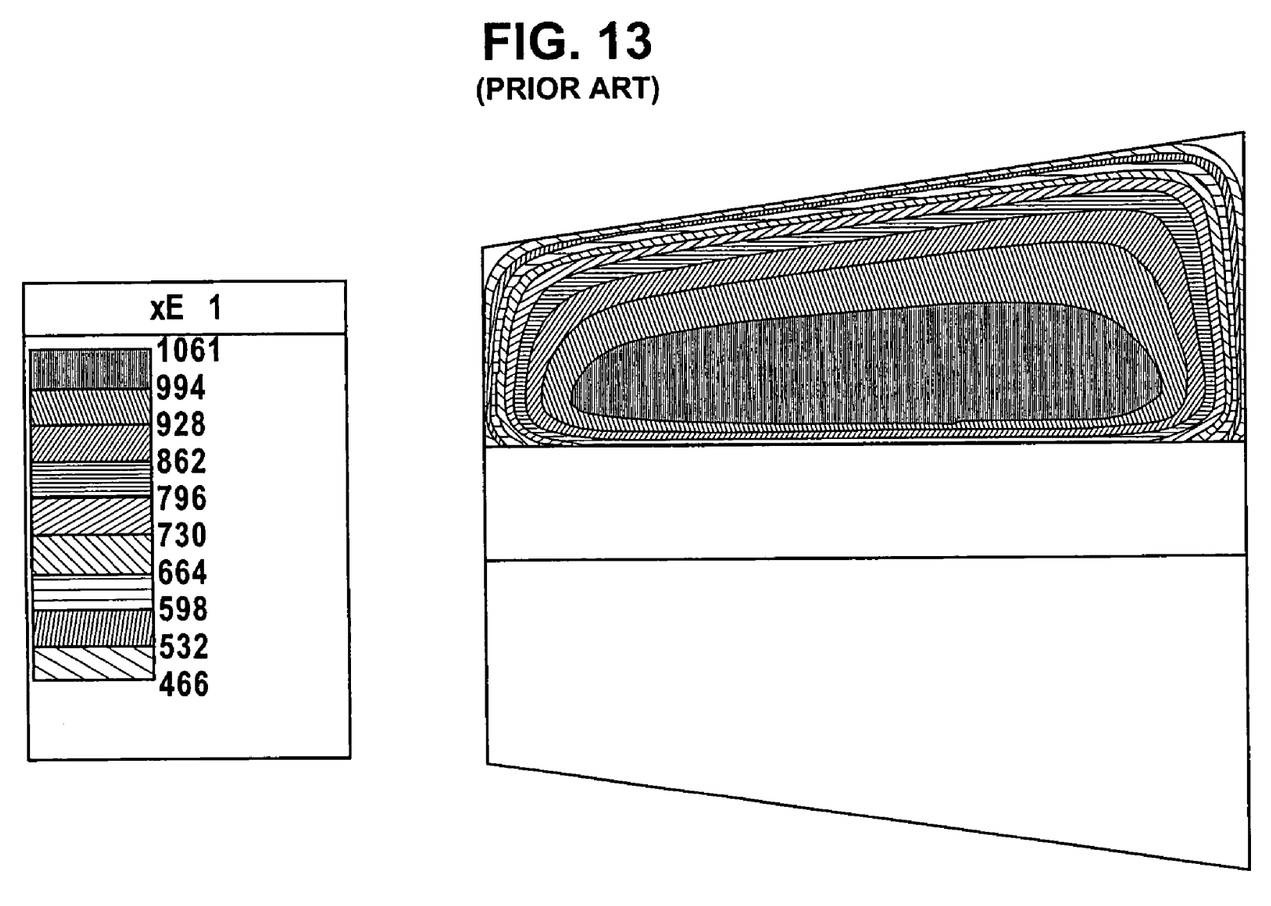
FIG. 13: illustration of a top view of the rotary motion voice coil motor of FIG. 2 showing the magnetic flux density in Gauss created by the permanent magnet arrangement.

FIG. 12 illustrates a perspective view of a voice coil motors incorporating the permanent magnet arrangements illustrated by FIG. 2. FIG. 13 illustrates the top view of the permanent magnet arrangement of the embodiment of FIG. 2 and the magnetic flux density in Gauss created thereby in the gap.

As noted, FIG. 11 and FIG. 13 illustrate the magnetic flux density in Gauss created in the voice coil gap by the FIG. 4 permanent magnet arrangement of an embodiment and the FIG. 2 prior art permanent magnet arrangement respectively. The magnet flux density of the FIG. 4 permanent magnet arrangement is higher than the FIG. 2 prior art permanent magnet arrangement at the outside edge of the gap. The higher magnetic flux density created by the magnet arrangement of an embodiment (i.e., as illustrated by FIG. 4) at the outside edge of the gap contributes to increased force or torque of the voice coil at its motion or rotational limit within the gap compared to the prior art magnet arrangement of FIG. 2.

Figure 14:
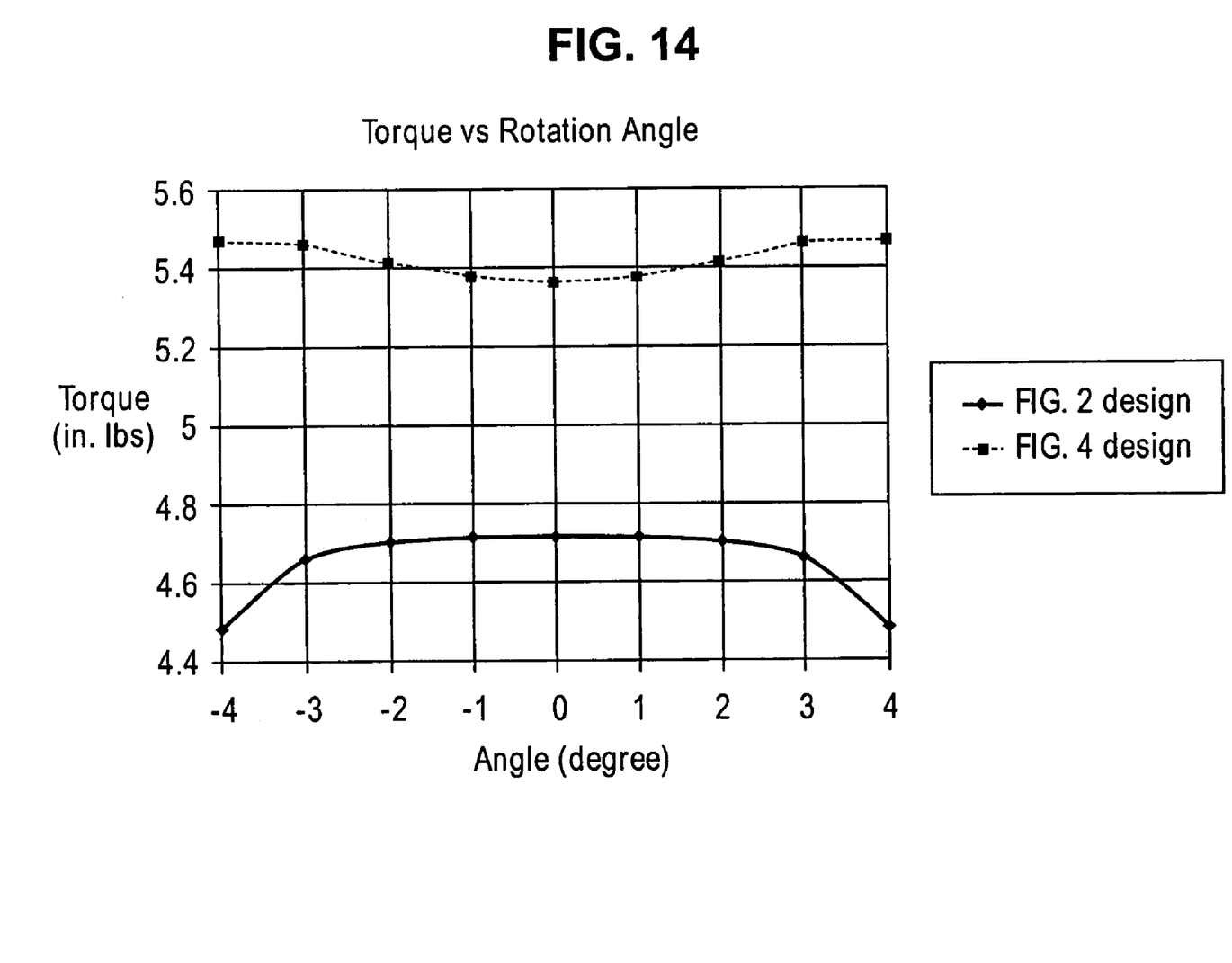
FIG. 14: illustration of the increased torque and uniformity of the rotary motion voice coil motor of FIG. 4 versus the rotary motion voice coil motor of FIG. 2.

Explained alternatively, FIG. 14 illustrates the torque versus a measure of the voice coil's rotational angle with respect to being centered in the gap for the prior art magnet assembly of FIG. 2 versus the magnet assembly of an embodiment as illustrated by FIG. 4. As indicated, the permanent magnet arrangement of FIG. 4 has increased torque and uniformity of torque over the motion range of the voice coil versus the prior art magnet assembly of FIG. 2. Further, the FIG. 4 permanent magnet arrangement of an embodiment is more efficient in terms of torque versus weight ratio than the prior art permanent magnet arrangement of FIG. 2. Further still, the torque at the rotational limits of the voice coil (i.e., −4 degrees rotation and +4 degrees rotation with respect to the center of the gap) is higher than at the center of the gap. This contrasts to the shape of the angle versus torque curve for the prior art arrangement of FIG. 2 that exhibits decreased torque at the rotational limits of the voice coil. It is to be understood that while provided with particular torque values, the torque values included in the graph of FIG. 14 are not meant to be limiting.

One skilled in the art will recognize the elegance of the disclosed embodiment in that it improves the performance of a voice coil motor.

What is claimed is:

1. A magnet assembly comprising:
   a first section including
      a first base plate and
      a first plurality of magnets coupled to the first base plate;
   a second section including
      a second base plate and
      a second plurality of magnets; and
      a third plurality of magnets coupled to both the first section and the second sections to define a gap between the first section and the second section, the gap having a substantially rectangular cross section;
   wherein each magnet has a pole orientation in the same plane, wherein the magnetic pole orientations of adjacent magnets are rotationally offset, and wherein the absolute value of the rotational offset between adjacent magnets is approximately 90 degrees.

2. The magnet assembly of claim 1, the first section further comprising:
- a first center magnet coupled to the first base plate, the first center magnet having a magnetic pole orientation substantially parallel to the first base plate and oriented in a first direction;
- a first magnet coupled to the first base plate adjacent to the first center magnet in the first direction, the first magnet having a magnetic pole orientation substantially orthogonal to the first base plate and oriented away from the first base plate;
- a second magnet coupled to the first base plate adjacent to the first magnet in the first direction, the second magnet having a magnetic pole orientation substantially antiparallel to the magnetic pole orientation of the first center magnet;
- a third magnet coupled to the first base plate adjacent to the first center magnet in a second direction, the second direction antiparallel to the first direction, the third magnet having a magnetic pole orientation substantially orthogonal to the first base plate and oriented toward the first base plate; and
- a fourth magnet coupled to the first base plate adjacent to the third magnet in the second direction, the fourth magnet having a magnetic pole orientation substantially parallel to the first base plate and oriented in the second direction.

3. The magnet assembly of claim 2, the second section further comprising:
- a second center magnet coupled to the second base plate, the second center magnet having a magnetic pole orientation substantially parallel to the second base plate and oriented in the second direction;
- a fifth magnet coupled to the second base plate adjacent to the second center magnet in the first direction, the fifth magnet having a magnetic pole orientation substantially orthogonal to the second base plate and oriented toward the second base plate;
- a sixth magnet coupled to the second base plate adjacent to the fifth magnet in the first direction, the sixth magnet having a magnetic pole orientation substantially parallel to the second base plate and oriented in the first direction;
- a seventh magnet coupled to the second base plate adjacent to the second center magnet in the second direction, the seventh magnet having a magnetic pole orientation substantially orthogonal to the second base plate and oriented away from the second base plate; and
- an eighth magnet coupled to the second base plate adjacent to the seventh magnet in the second direction, the eighth magnet having a magnetic pole orientation substantially parallel to the surface of the second base plate and oriented in the first direction.

4. The magnet assembly of claim 3, the third plurality of magnets further comprising:
- a ninth magnet coupled to the second magnet and the sixth magnet, the ninth magnet having a magnetic pole orientation substantially orthogonal to the first base plate and the second base plate and oriented toward the first base plate; and
- a tenth magnet coupled to the eighth magnet and the fourth magnet, the tenth magnet having a magnetic pole orientation substantially orthogonal to the first base plate and the second base plate and oriented toward the second base plate.

5. The magnet assembly of claim 4, the magnets further comprising neodymium iron boron.

6. The magnet assembly of claim 5, the first base plate and the second base plate further comprising low carbon steel.

7. A magnet assembly comprising:
- a base plate;
- a center magnet coupled to the base plate, the center magnet having a magnetic pole orientation substantially parallel to a surface of the base plate and oriented in a first direction;
- a first magnet coupled to the base plate adjacent to the center magnet in the first direction, the first magnet having a magnetic pole orientation substantially orthogonal to the base plate and oriented away from the base plate;
- a second magnet coupled to the base plate adjacent to the first magnet in the first direction, the second magnet having a magnetic pole orientation substantially antiparallel to the magnetic pole orientation of the center magnet;
- a third magnet coupled to the base plate adjacent to the center magnet in a second direction, the second direction antiparallel to the first direction, the third magnet having a magnetic pole orientation substantially orthogonal to the base plate and oriented toward the base plate; and
- a fourth magnet coupled to the base plate adjacent to the third magnet in the second direction, the fourth magnet having a magnetic pole orientation substantially parallel to the surface of the base plate and oriented in the second direction, wherein the cross-sectional shape of at least one of the magnets in a plane parallel to the base plate is trapezoidal.

8. A magnet assembly comprising:
- a plurality of magnets that define a gap, the gap having a rectangular cross section enclosed by the plurality of magnets, each of the magnets having a magnetic pole substantially in the same plane as the rectangular cross section, and each of the magnets having a magnetic pole orientation rotationally offset within the plane from each adjacent magnet wherein the absolute value of the magnetic pole orientation offset between each adjacent magnet is substantially 90 degrees.

9. A voice coil motor comprising:
- a voice coil; and
- a magnet assembly including
  - a first section including
    - a first base plate and
    - a first plurality of magnets coupled to the first base plate;
  - a second section including
    - a second base plate and
    - a second plurality of magnets; and
    - a third plurality of magnets coupled to both the first section and the second sections to define a gap between the first section and the second section, the gap having a substantially rectangular cross section;
  - wherein each magnet has a pole orientation in the same plane, wherein the magnetic pole orientations of adjacent magnets are rotationally offset, and wherein the absolute value of the rotational offset between adjacent magnets is approximately 90 degrees.

10. The voice coil motor of claim 9, the first section further comprising:
- a first center magnet coupled to the first base plate, the first center magnet having a magnetic pole orientation substantially parallel to the first base plate and oriented in a first direction;
- a first magnet coupled to the first base plate adjacent to the first center magnet in the first direction, the first magnet having a magnetic pole orientation substantially orthogonal to the first base plate and oriented away from the first base plate;
- a second magnet coupled to the first base plate adjacent to the first magnet in the first direction, the second magnet having a magnetic pole orientation substantially antiparallel to the magnetic pole orientation of the first center magnet;
- a third magnet coupled to the first base plate adjacent to the first center magnet in a second direction, the second direction antiparallel to the first direction, the third magnet having a magnetic pole orientation substantially orthogonal to the first base plate and oriented toward the first base plate; and
- a fourth magnet coupled to the first base plate adjacent to the third magnet in the second direction, the fourth magnet having a magnetic pole orientation substantially parallel to the first base plate and oriented in the second direction.

11. The voice coil motor of claim 10, the second section further comprising:
- a second center magnet coupled to the second base plate, the second center magnet having a magnetic pole orientation substantially parallel to the second base plate and oriented in the second direction;
- a fifth magnet coupled to the second base plate adjacent to the second center magnet in the first direction, the fifth magnet having a magnetic pole orientation substantially orthogonal to the second base plate and oriented toward the second base plate;
- a sixth magnet coupled to the second base plate adjacent to the fifth magnet in the first direction, the sixth magnet having a magnetic pole orientation substantially parallel to the second base plate and oriented in the first direction;
- a seventh magnet coupled to the second base plate adjacent to the second center magnet in the second direction, the seventh magnet having a magnetic pole orientation substantially orthogonal to the second base plate and oriented away from the second base plate; and
- an eighth magnet coupled to the second base plate adjacent to the seventh magnet in the second direction, the eighth magnet having a magnetic pole orientation substantially parallel to the surface of the second base plate and oriented in the first direction.

12. The voice coil motor of claim 11, the third plurality of magnets further comprising:
- a ninth magnet coupled to the second magnet and the sixth magnet, the ninth magnet having a magnetic pole orientation substantially orthogonal to the first base plate and the second base plate and oriented toward the first base plate; and
- a tenth magnet coupled to the eighth magnet and the fourth magnet, the tenth magnet having a magnetic pole orientation substantially orthogonal to the first base plate and the second base plate and oriented toward the second base plate.

13. The voice coil motor of claim 12, the magnets further comprising neodymium iron boron.

14. The voice coil motor of claim 13, the first base plate and the second base plate further comprising low carbon steel.

* * * * *